(12) United States Patent
Schulz-Dobrick et al.

(10) Patent No.: US 8,709,298 B2
(45) Date of Patent: Apr. 29, 2014

(54) ELECTRODE MATERIAL AND USE THEREOF FOR PRODUCTION OF ELECTROCHEMICAL CELLS

(75) Inventors: Martin Schulz-Dobrick, Mannheim (DE); Hartmut Hibst, Schriesheim (DE); Jordan Keith Lampert, Ludwigshafen (DE); Robert Glaum, Rheinbach-Flerzheim (DE); Helmut Ehrenberg, Eggenstein-Leopoldshafen (DE); Katharina Gerber, Bonn (DE); Markus Herklotz, Dresden (DE); Frieder Scheiba, Dresden (DE)

(73) Assignee: BASF SE, Ludwigshafen (DE)

( * ) Notice: Subject to any disclaimer, the term of this patent is extended or adjusted under 35 U.S.C. 154(b) by 160 days.

(21) Appl. No.: 13/111,263

(22) Filed: May 19, 2011

(65) Prior Publication Data

US 2011/0284806 A1 Nov. 24, 2011

Related U.S. Application Data

(60) Provisional application No. 61/346,919, filed on May 21, 2010.

(51) Int. Cl.
*H01B 1/02* (2006.01)
*C01B 15/16* (2006.01)
*H01M 4/13* (2010.01)
*H01M 4/48* (2010.01)

(52) U.S. Cl.
USPC ............... 252/518.1; 252/519.1; 423/306; 423/332; 429/218.1; 429/231

(58) Field of Classification Search
USPC ............ 252/518.1, 519.1; 423/306, 312, 324, 423/331, 332; 429/218.1, 221, 224, 231
See application file for complete search history.

(56) References Cited

U.S. PATENT DOCUMENTS

| 7,008,566 B2 * | 3/2006 | Barker et al. ............... 252/518.1 |
| 2003/0087154 A1 | 5/2003 | Ohzuku et al. |
| 2011/0147671 A1 | 6/2011 | Bramnik et al. |
| 2011/0227001 A1 | 9/2011 | Schulz-Dobrick et al. |

FOREIGN PATENT DOCUMENTS

| EP | 0 904 607 B1 | 10/2004 |
| JP | 2007-214118 | * 8/2007 |
| WO | WO 2010/023194 A1 | 3/2010 |

OTHER PUBLICATIONS

Jensen et al, Hydrothermal synthesis of Lithium Zinc Phosphates: Structural investigation of Twinned Li4Zn(PO4)2 and a high temperature polymorph LiZn(PO4)2, J. Solid Stae Chem. 166, 341-351 (2002).*
U.S. Appl. No. 13/168,273, filed Jun. 24, 2011, Leitner, et al.
International Search Report issued Sep. 30, 2011, in PCT/EP2011/057958.
T. R. Jensen, et al., "Hydrothermal Synthesis of Lithium Zinc Phosphates: Structural Investigation of Twinned $\alpha$-Li$_4$Zn(PO$_4$)$_2$ and a High Temperature Polymorph $\beta$-Li$_4$Zn(PO$_4$)$_2$", Journal of Solid State Chemistry, vol. 166, XP 2658136, 2002, pp. 341-351.
Shoji Yamanaka, "Ionic Conductivity in Anhydrous Crystalline Zirconium Phosphates, Zr(MPO$_4$)$_2$ (M=Li, Na, K), With Layered Structures", J. Inorg. Nucl. Chem., vol. 42, XP 2658137, 1979, pp. 717-720.

* cited by examiner

*Primary Examiner* — Monique Peets
(74) *Attorney, Agent, or Firm* — Oblon, Spivak, McClelland, Maier & Neustadt, L.L.P.

(57) ABSTRACT

A compound of the general formula (I)

$$A_a M_b P_c O_d \qquad (I)$$

in which the variables are each defined as follows:
M is at least one transition metal selected from Co, Ni, Mn, Fe and Cr,
A is Li or $Li_x Na_{1-x}$ where x is in the range from 0.2 to 1.0,
a is in the range from 3.5 to 4.5,
b is in the range from 0.8 to 1.2,
c is in the range from 1.8 to 2.2 and
d is in the range from 7.2 to 8.8.

18 Claims, 1 Drawing Sheet

Schematic diagram of a dismantled electrochemical cell for testing of inventive electrodes
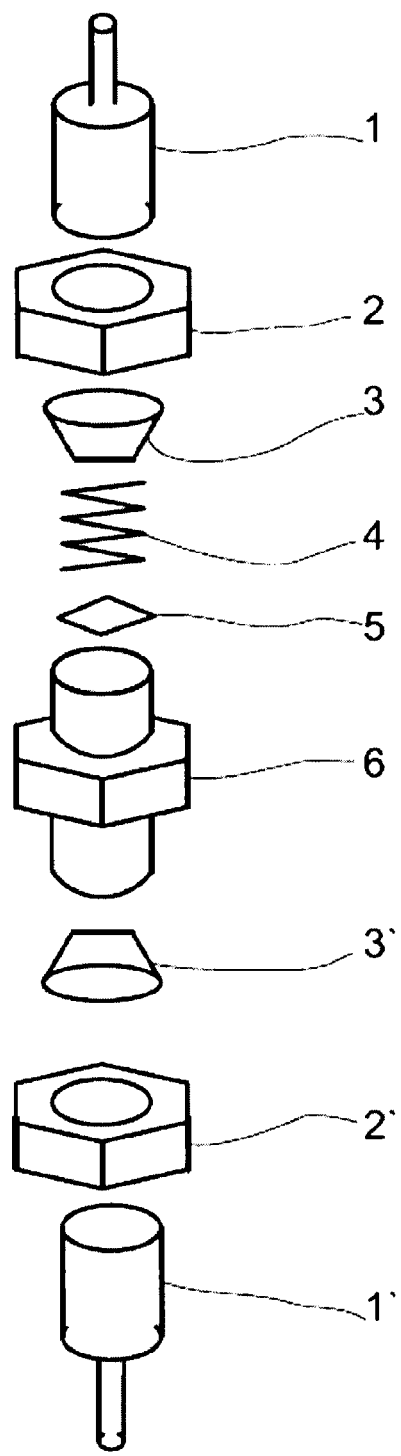

ELECTRODE MATERIAL AND USE THEREOF FOR PRODUCTION OF ELECTROCHEMICAL CELLS

This patent application claims the benefit of U.S. provisional patent application Ser. No. 61/346,919 filed May 21, 2010, incorporated in its entirety herein by reference.

Compounds and use thereof for production of electrochemical cells

The present invention relates to compounds of the general formula (I)

$$A_a M_b P_c O_d \quad (I)$$

in which the variables are each defined as follows:
M is at least one transition metal selected from Co, Ni, Mn, Fe and Cr,
A is Li or $Li_x Na_{1-x}$ where x is in the range from 0.2 to 1.0,
a is in the range from 3.5 to 4.5,
b is in the range from 0.8 to 1.2,
c is in the range from 1.8 to 2.2 and
d is in the range from 7.2 to 8.8.

The present invention further relates to electrodes which comprise at least one inventive electrode material. The present invention further relates to electrochemical cells which comprise at least one inventive electrode. The present invention further relates to compounds which are suitable for production of electrochemical cells.

Electrochemical cells which have a high storage capacity coupled with maximum operating voltage are of increasing significance. The desired capacities generally cannot be achieved with electrochemical cells which work on the basis of aqueous systems.

In lithium ion batteries, charge transfer is ensured not by protons in more or less hydrated form, but rather by lithium ions in a nonaqueous solvent or in a nonaqueous solvent system. A particular role is assumed by the electrode material.

Many electrode materials known from the literature are mixed oxides of lithium and one or more transition metals; see, for example, US 2003/0087154. In the charged state of the battery, such materials tend to decompose and to react with the electrolyte system, such that the maximum charging voltage is limited in many cases. This limit has an adverse effect on the achievable energy density of the battery. A high energy density of the battery is generally advantageous, especially for mobile applications.

Further known electrode materials are lithium metal phosphates of the general formula $LiMetPO_4$ (Met=Fe, Mn, Ni, Co) which have an olivine structure; see, for example, EP 0 904 607. However, such lithium metal phosphates have a low energy density.

Accordingly, the compounds defined at the outset have been found, which are also referred to in the context of the present invention as inventive compounds or inventive compounds of the general formula (I).

In inventive compounds of the general formula (I)

$$A_a M_b P_c O_d \quad (I)$$

the variables are each defined as follows:
M is at least one transition metal selected from Co, Ni, Mn, Fe and Cr, preferably Co.
A is selected from Li and $Li_x Na_{1-x}$ where x is in the range from 0.2 to 1.0, preferably 0.2 to 0.99.
a is in the range from 3.5 to 4.5, preferably 3.6 to 4.1 and more preferably 4,
b is in the range from 0.8 to 1.2, preferably 0.9 to 1.1 and more preferably 1.0,
c is in the range from 1.8 to 2.2, preferably 1.9 to 2.1 and more preferably 2.0, and
d is in the range from 7.2 to 8.8, preferably to 7.6 to 8.2 and more preferably 8.0.

In a preferred embodiment of the present invention, d is four times as large as c.

In one embodiment of the present invention, the variables a to d are each selected as follows: a=4, b=1, c=2 and d=8.

M may be replaced by Zn to an extent of up to 20 mol %, preferably to an extent of up to 10 mol %. In one embodiment of the present invention, M is selected from $Co_y Zn_{1-y}$ where y is in the range from 0.75 to 1.0, for example to 0.99.

In one embodiment of the present invention, P is replaced to an extent of up to 10 mol % by B, Si or As, preferably by Si or B.

In one embodiment of the present invention, the formal oxidation state of M is +2.

In the cases in which P is replaced by Si, the mean oxidation state of M may be greater than +2.

The inventive compounds generally do not crystallize in the olivine structure.

Inventive compounds of the general formula (I) may be present in various crystal polymorphs. The structure of the particular crystal lattice can be determined by methods known per se, for example X-ray diffraction or electron diffraction.

In one embodiment of the present invention, inventive compound of the general formula (I) is in the form of an amorphous powder. In another embodiment of the present invention, inventive compound of the general formula (I) is in the form of crystalline powder.

In one embodiment of the present invention, inventive compound of the general formula (I) is in the form of particles having a mean diameter (number average) in the range from 10 nm to 200 µm, preferably 20 nm to 30 µm, measured by evaluation of electron micrographs.

Inventive compounds have a high energy density and are particularly suitable for production of inventive composites and for production of inventive electrodes.

In one embodiment of the present invention, inventive compound of the general formula (I) is present in inventive electrodes as a composite with electrically conductive, carbonaceous material (B). For example, compound of the general formula (I) in inventive electrodes may be treated, for example coated, with electrically conductive, carbonaceous material (B). Such composites likewise form part of the subject matter of the present invention.

Electrically conductive, carbonaceous material can be selected, for example, from graphite, carbon black, carbon nanotubes, graphene or mixtures of at least two of the aforementioned substances. In the context of the present invention, electrically conductive, carbonaceous material can also be referred to as electrically conductive, carbonaceous material (B) or as carbon (B) for short.

In one embodiment of the present invention, electrically conductive, carbonaceous material (B) is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, electrically conductive, carbonaceous material (B) is partially oxidized carbon black.

In one embodiment of the present invention, electrically conductive, carbonaceous material (B) comprises carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al. in Chemie Ingenieur Technik 2006, 78, 94 to 100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon-containing compounds in a light arc, specifically in the presence or absence of a decomposition catalyst.

In one embodiment, the decomposition of volatile carbon-containing compound or carbon-containing compounds is performed in the presence of a decomposition catalyst, for example Fe, Co or preferably Ni.

In the context of the present invention, graphene is understood to mean almost ideally or ideally two-dimensional hexagonal carbon crystals with a structure analogous to single graphite layers.

In one embodiment of the present invention, the weight ratio of compound of the general formula (I) and carbon (B) is in the range from 200:1 to 5:1, preferably 100:1 to 10:1.

A further aspect of the present invention is an electrode comprising at least one compound of the general formula (I), at least one electrically conductive, carbonaceous material (B) and at least one binder (C).

Compound of the general formula (I) and electrically conductive, carbonaceous material (B) have been described above.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Furthermore, Polyisoprene and polyacrylates are suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have a mean molecular weight $M_w$ in the range from 50 000 to 1 000 000 g/mol, preferably to 500 000 g/mol.

Binders (C) may be crosslinked or uncrosslinked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

In one embodiment, in inventive electrodes, electrically conductive, carbonaceous material (B) is selected, for example, from graphite, carbon black, carbon nanotubes, graphene or mixtures of at least two of the aforementioned substances.

In one embodiment of the present invention, inventive electrode material comprises:
 (A) in the range from 60 to 98% by weight, preferably 70 to 96% by weight, of compound of the general formula (I),
 (B) in the range from 1 to 20% by weight, preferably 2 to 15% by weight, of binder, (C) in the range from 1 to 25% by weight, preferably 2 to 20% by weight, of electrically conductive, carbonaceous material.

The geometry of inventive electrodes can be selected within wide limits. It is preferred to configure inventive electrodes in thin layers, for example in layers with a thickness in the range from 10 μm to 250 μm, preferably 20 to 130 μm.

In one embodiment of the present invention, inventive electrodes further comprise a foil, for example a metal foil, especially an aluminum foil, or a polymer film, for example a polyester film, which may be untreated or siliconized.

The present invention further provides for the use of inventive electrode materials or inventive electrodes in electrochemical cells. The present invention further provides a process for producing electrochemical cells using inventive electrode material or inventive electrodes. The present invention further provides electrochemical cells comprising at least one inventive electrode material or at least one inventive electrode.

By definition, inventive electrodes in inventive electrochemical cells serve as cathodes. Inventive electrochemical cells comprise a counter-electrode, which is defined as the anode in the context of the present invention, and which may, for example, be a carbon anode, especially a graphite anode, a lithium anode, a silicon anode or a lithium titanate anode.

Inventive electrochemical cells may, for example, be batteries or accumulators.

Inventive electrochemical cells may comprise, in addition to the anode and inventive electrode, further constituents, for example conductive salt, nonaqueous solvent, separator, output conductor, for example made from a metal or an alloy, and also cable connections and housing.

In one embodiment of the present invention, inventive electrical cells comprise at least one nonaqueous solvent which may be liquid or solid at room temperature, preferably selected from polymers, cyclic or noncyclic ethers, cyclic and noncyclic acetals and cyclic or noncyclic organic carbonates.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (II) and (III)

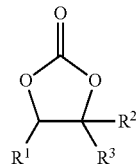

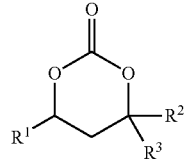

in which $R^1$, $R^2$ and $R^3$ may be the same or different and are selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

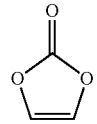

The solvent(s) is (are) preferably used in what is known as the anhydrous state, i.e. with a water content in the range from 1 ppm to 0.1% by weight, determinable, for example, by Karl Fischer titration.

Inventive electrochemical cells further comprise one or more conductive salts. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mXLi$, where m is defined as follows:

m=1 when X is selected from oxygen and sulfur,
m=2 when X is selected from nitrogen and phosphorus, and
m=3 when X is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, separators may be selected from PET nonwovens filled with inorganic particles. Such separators may have a porosity in the range from 40 to 55%. Suitable pore diameters are, for example, in the range from 80 to 750 nm.

Inventive electrochemical cells further comprise a housing which may have any desired shape, for example cuboidal or the shape of a cylindrical disk. In one variant, the housing used is a metal foil elaborated as a pouch.

Inventive electrochemical cells give a high voltage and are notable for a high energy density and good stability.

Inventive electrochemical cells can be combined with one another, for example in series connection or in parallel connection. Series connection is preferred.

The present invention further provides for the use of inventive electrochemical cells in units, especially in mobile units. Examples of mobile units are motor vehicles, for example automobiles, bicycles, aircraft, or water vehicles such as boats or ships. Other examples of mobile units are those which are moved manually, for example computers, especially laptops, telephones, or power tools, for example from the building sector, especially drills, battery-powered drills or battery-powered tackers.

The use of inventive electrochemical cells in units gives the advantage of a longer run time before recharging. If it were desired to achieve the same run time with electrochemical cells with lower energy density, a higher weight would have to be accepted for electrochemical cells.

The present invention further provides a process for production of electrodes, which comprises
(A) mixing at least one compound of the general formula (I)

$$A_aM_bP_cO_d \tag{I}$$

in which the variables are each defined as follows:
M is at least one transition metal selected from Co, Ni, Mn, Fe and Cr,
A is Li or $Li_xNa_{1-x}$ where x is in the range from 0.2 to 1.0,
a is in the range from 3.5 to 4.5,
b is in the range from 0.8 to 1.2,
c is in the range from 1.8 to 2.2 and
d is in the range from 7.2 to 8.8;
(B) at least one electrically conductive, carbonaceous material and
(C) at least one binder
with one another in one or more steps, and optionally applying them to
(D) at least one metal foil or polymer film.

Compound of the general formula (I), electrically conductive, carbonaceous material or carbon (B) and binder (C) have already been defined above.

The mixing can be effected in one or more steps.

In one variant of the process according to the invention, compound of the general formula (I), carbon (B) and binder (C) are mixed in one step, for example in a mill, especially in a ball mill. Subsequently, the mixture thus obtainable is applied in a thin layer to a carrier, for example a metal foil or polymer film (D). Before or on incorporation into an electrochemical cell, the carrier can be removed. In other variants, the carrier is retained.

In another variant of the process according to the invention, compound of the general formula (I), carbon (B) and binder (C) are mixed in a plurality of steps, for example in a mill, especially in a ball mill. For example, it is possible first to mix compound of the general formula (I) and carbon (B) with one another. This is followed by mixing with binder (C). Subsequently, the mixture thus obtainable is applied in a thin layer to a carrier, for example a metal foil or polymer film (D). Before or on incorporation into an electrochemical cell, the carrier can be removed. In other variants, the carrier is not removed.

In one variant of the process according to the invention, compound of the general formula (I), carbon (B) and binder (C) are mixed in water or an organic solvent (e.g. N-methylpyrrolidone or acetone). The suspension thus obtainable is applied in a thin layer to a carrier, for example a metal foil or polymer film (D), and the solvent is then removed by a heat treatment. Before or on incorporation into an electrochemical cell, the carrier can be removed. In other variants, the carrier is not removed.

Thin layers in the context of the present invention may, for example, have a thickness in the range from 2 μm up to 250 μm.

To improve mechanical stability, the electrodes can be treated thermally or preferably mechanically, for example pressed or calendered.

In one embodiment of the present invention, a carbonaceous, conductive layer is obtained by obtaining a mixture comprising at least one compound of the general formula (I) and at least one carbonaceous, thermally decomposable compound, and subjecting this mixture to a thermal decomposition.

In one embodiment of the present invention, a carbonaceous, conductive layer is obtained by virtue of the presence, during the synthesis of the compound of the general formula (I), of at least one carbonaceous, thermally decomposable compound, which decomposes to form a carbonaceous, conductive layer on the compound of the general formula (I).

The process according to the invention is very suitable for production of inventive electrode material and electrodes obtainable therefrom.

The present invention further provides composites comprising at least one compound of the general formula (I)

$$A_aM_bP_cO_d \tag{I}$$

in which the variables are each defined as follows:
M is at least one transition metal selected from Co, Ni, Mn, Fe and Cr,
A is Li or $Li_xNa_{1-x}$ where x is in the range from 0.2 to 1.0,
a is in the range from 3.5 to 4.5,
b is in the range from 0.8 to 1.2,
c is in the range from 1.8 to 2.2,
d is in the range from 7.2 to 8.8,
and
at least one electrically conductive, carbonaceous material, also referred to as carbon (B).

In inventive composites, compound of the general formula (I) has been treated, for example coated, with carbon (B).

In one embodiment of the present invention, in inventive composites, compound of the general formula (I) and carbon (B) are present in a weight ratio in the range from 98:1 to 12:5, preferably 48:1 to 7:2.

Inventive composites are particularly suitable for production of inventive electrode material. A process for production thereof is described above and likewise forms part of the subject matter of the present invention.

The present invention further provides a process for preparing inventive compounds of the general formula (I), also referred to as synthesis process according to the invention. The synthesis process according to the invention can be performed in such a way that at least one phosphate, carbonate or oxide of metal M and Li, and optionally further compounds, for example ammonium hydrogenphosphate, especially $(NH_4)H_2PO_4$ or $(NH_4)_2HPO_4$, are heated with one another to temperatures above 700° C., for example at temperatures in the range from 800 to 1000° C., preferably to 950° C. The heating can be effected without solvent, for example in crucibles, ampoules, stirred tanks, autoclaves, or in rotary furnaces.

In another embodiment of the synthesis process according to the invention, before the actual heating, at least one phosphate, carbonate or oxide of metal M and Li, and optionally further compounds, for example ammonium hydrogenphosphate, especially $(NH_4)H_2PO_4$ or $(NH_4)_2HPO_4$, are mixed with one another in a solvent or solvent mixture and heated to temperatures in the range from 150 to 350° C. This is followed by heating without solvents to temperatures above 700° C., for example at temperatures in the range from 800 to 1000° C., preferably to 950° C. Useful solvents are preferably those having a boiling point of at least 150° C., for example ethylene glycol, diethylene glycol, triethylene glycol or dimethyl sulfoxide (DMSO).

In a specific variant of the synthesis process according to the invention, before the actual heating, at least one phosphate, carbonate or oxide of metal M and Li, and optionally further compounds, for example ammonium hydrogenphosphate, especially $(NH_4)H_2PO_4$ or $(NH_4)_2HPO_4$, are mixed with one another in a solvent or solvent mixture and additionally in the presence of a di-, tri- or polycarboxylic acid, for example adipic acid or especially citric acid.

The synthesis process according to the invention can be performed under protective gas or under air.

The synthesis process according to the invention can be performed at standard pressure. In another embodiment of the present invention, the synthesis process according to the invention can be performed at pressures in the range from 1.1 to 25 bar. In another embodiment of the present invention, the synthesis process according to the invention can be performed under reduced pressure, for example at a pressure in the range from 1 mbar to 500 mbar.

The heating within the synthesis process according to the invention can be performed over a period totaling one to 100 hours, preferably one hour to 24 hours.

After the heating, the mixture is cooled again. Preference is given to cooling rapidly, for example from 700 to 1000° C. down to 50 to 70° C. within 10 minutes. The more rapid the cooling, the purer inventive compounds are.

The invention is illustrated by working examples.
Materials Used:
Electrically conductive, carbonaceous materials:
Carbon (B.1): carbon black, BET surface area of 62 m²/g, commercially available as "Super P Li" from Timcal Binder (C.1): polyvinylidene fluoride, as pellets, commercially available as Solef® PVDF 1013 from Solvay.

I. Preparation of Inventive Compounds

I.1 Preparation of Inventive Compound (I.1)

$Li_4Co(PO_4)_2$ was prepared proceeding from $CoCO_3$, $Li_2CO_3$ and $(NH_4)_2HPO_4$ as reactants. The reactants were triturated with one another in an agate mortar in a molar ratio of 1:2:2. The powder thus obtained was introduced into an alumina crucible and heated at 400° C. under air for 2 h (heating rate 150 K/h). The resulting material was triturated in an agate mortar and the powder was used to produce pressed disks (1 g of material per disk). The disks were introduced into an alumina crucible and heated at 900° C. under air for 12 h (heating rate 150 K/h). Subsequently, the alumina crucible was removed from the furnace at 900° C. and cooled to room temperature within a few minutes. The disks were comminuted. The powder so obtained was deep blue. By means of an X-ray diffractogram (Cu—Kα1 radiation) of the powder, it was possible to identify inventive compound (I.1) as $Li_4Co(PO_4)_2$.

I.2 Preparation of Inventive Compound (I.2)

$Li_4Co(PO_4)_2$ was prepared proceeding from CoO and $Li_4P_2O_7$ as reactants. The reactants were triturated with one another in an agate mortar in a molar ratio of 1:1. The powder thus obtained was used to produced pressed rods which were sealed by melting into an evacuated silica glass ampoule (15 cm³) and introduced into a one-zone furnace. The silica glass ampoule was heated at 850° C. for 72 h and then removed from the furnace and cooled to room temperature within a few minutes. The pressed rod was comminuted. The powder so obtained was deep blue. By means of an X-ray diffractogram (Cu—Kα1 radiation) of the powder, it was possible to identify inventive compound (I.2) as $Li_4Co(PO_4)_2$.

I.3 Preparation of Inventive Compound (I.2) Contaminated with $LiCoPO_4$

An alternative preparation of $Li_4Co(PO_4)_2$ proceeded from CoO and $Li_4P_2O_7$ as reactants. The reactants were suspended in a mixture of ethylene glycol and citric acid (40:60 parts by weight). The suspension thus obtained was subsequently heated to 250° C. until a brown, caramel-like residue had formed. This was triturated in an agate mortar and then heated, in a silica glass ampoule open on one side, at 350° C. under air for 24 h and then at 850° C. for 72 h. Then the ampoule was removed from the furnace and cooled to room temperature within a few minutes. The powder present in the ampoule was deep blue. By means of an X-ray diffractogram (Cu—Kα1 radiation) of the powder, $Li_4Co(PO_4)_2$ was identified as the main phase and $LiCoPO_4$ as the secondary phase (approx. 5%).

I.4 Preparation of Inventive Compound (I.3)

The preparation of $Li_4Cu_{0.8}Zn_{0.2}(PO_4)_2$ proceeded from $CoCO_3$, ZnO, $Li_2CO_3$ and $(NH_4)_2HPO_4$ as reactants. The reactants were triturated with one another in an agate mortar in a molar ratio of 0.8:0.2:2:2. The powder thus obtained was introduced into an alumina crucible and heated at 400° C. under air for 2 h (heating rate 150 K/h). The resulting material was triturated in an agate mortar and the powder thus obtained was used to produce pressed disks (1 g of material per disk). The pressed disks were introduced into an alumina crucible and heated at 900° C. under air for 12 h (heating rate 150 K/h). Subsequently, the alumina crucible was removed from the furnace at 900° C. and the pressed disks were cooled to room temperature within a few minutes. The pressed disks were comminuted. The powder so obtained was deep blue. By means of an X-ray diffractogram (Cu—Kα1 radiation) of the powder, it was possible to identify inventive compound (I.3) as $Li_4CO_{0.8}Zn_{0.2}(PO_4)_2$.

I.5 Preparation of Inventive Compound (I.4)

$Li_{3.6}Na_{0.4}Co(PO_4)_2$ was prepared proceeding from $CoCO_3$, $Li_2CO_3$, $Na_2CO_3$ and $(NH_4)_2HPO_4$ as reactants. The reactants were triturated with one another in an agate mortar in a molar ratio of 1:1.8:0.2:2. The powder thus obtained was introduced into an alumina crucible and heated at 400° C. under air for 2 h (heating rate 150 K/h). The material thus formed was triturated in an agate mortar and the powder obtained was used to produce pressed disks (1 g of material per disk). The pressed disks were introduced into an alumina crucible and heated at 900° C. under air for 12 h (heating rate 150 K/h). Subsequently, the crucible was removed from the furnace at 900° C. and the disks were cooled to room temperature within a few minutes. The disks were comminuted. The powder so obtained was deep blue. By means of an X-ray diffractogram (Cu—Kα1 radiation) of the powder, it was possible to identify inventive compound (I.4) as $Li_{3.6}Na_{0.4}Co(PO_4)_2$.

I.6 Preparation of Inventive Compound (I.5)

$LiNa_3Co(PO_4)_2$ was prepared proceeding from $CoCO_3$, $Li_2CO_3$, $Na_2CO_3$ and $(NH_4)_2HPO_4$ as reactants. The reactants were triturated with one another in an agate mortar in a molar ratio of 1:0.5:1.5:2. The powder thus obtained was introduced into an alumina crucible and heated at 400° C. under air for 2 h (heating rate 150 K/h). The material thus formed was triturated in an agate mortar and the powder obtained was used to produce pressed disks (1 g of material per disk). The pressed disks were introduced into an alumina crucible and heated at 600° C. under air for 12 h (heating rate 150 K/h). Subsequently, the crucible was removed from the furnace at 600° C. and the disks were cooled to room temperature within a few minutes. The disks were comminuted. The powder present was bright blue. By means of an X-ray diffractogram (Cu—Kα1 radiation) of the powder, it was possible to identify inventive compound (I.5) as $LiNa_3Co(PO_4)_2$.

II. Production of Inventive Electrochemical Cells using the Example of $Li_4CO(PO_4)_2$ from Example I.1

II.1 Production of an Inventive Cathode (Electrode)

All of the electrode production described hereinafter was performed in an inert gas glove box under argon as protective gas and with exclusion of water and oxygen.

48 mg of the powder of $Li_4Co(PO_4)_2$ from example I.1 were mixed with 6 mg of (B.1) and with 6 mg of (C.1) in an agate mortar, and crushed with a pestle for 10 minutes. This gave a mixture. To produce the electrode, the mixture was pressed onto aluminum meshes (nominal aperture: 0.11 mm, wire diameter: 0.1 mm) (pressure=5 t). The electrodes thus obtained were then stored at 95° C. in a vacuum drying cabinet over a period of 24 hours. This gave inventive electrodes.

II.2 Production of an Inventive Electrochemical Cell

In the assembly of the inventive electrochemical cell, it was put together from the bottom upward according to the schematic diagram in FIG. 1. In FIG. 1, the anode side is at the top, the cathode side at the bottom.

The labels mean:
1, 1' Dies
2, 2' Nuts
3, 3' Sealing ring—two in each case, the second sealing ring in each case, which is somewhat smaller, is not shown here
4 Coil spring
5 Nickel output conductor
6 Housing The cathode material which has been pressed on to the aluminum mesh and dried was applied to the die on the cathode side, 1'. Subsequently, two glass fiber separators (thickness 0.5 mm) were placed on to the aluminum mesh. The electrolyte was applied to the separators, and consisted of 1 M $LiPF_6$ dissolved in ethylene carbonate and dimethyl carbonate in a mass ratio of 1:1. The anode used was a foil of elemental lithium (thickness 0.5 mm) which had been placed on to the impregnated separators. The output conductor used was a nickel plate which was applied directly to the lithium. Subsequently, the assembly screwed together. By means of a steel spring, and by virtue of the pressure generated by the screw connection of the anode die, electrical contact was ensured.

This gave inventive electrochemical cells EZ.1.

II.3 Characterization of Inventive Electrochemical Cells EZ.1

The electrochemical characterizations were carried out with a VMP3 potentiostat from Bio-Logic SAS, Claix, France. The inventive electrochemical cells EZ.1 were equilibrated to 25° C. in a climate-controlled cabinet.

The electrochemical characterization method used was a method known as PITT (potentiostatic intermittent titration technique). In this method, the voltage is not increased at fixed time intervals, but instead the time per potential step is defined via a limiting current $I_{Lim}$. If the current falls below $I_{Lim}$, the potential is increased by ΔE. In the case of selection of a sufficiently small limiting current, this measurement principle, in contrast to cyclic voltammetry, allows relatively exact determination of the redox potentials of electrode processes with slow kinetics. The consideration of the amount of charge dq which has flowed per potential step shows, by means of maxima, the potentials at which the oxidation and reduction processes take place.

The first charging and discharge operation of two inventive cells EZ.1 in each case was studied. The potential applied with respect to lithium was varied between 3.0 V and 5.2 V. $I_{Lim}$ was set to 5.25 μA.

For EZ.1, electrochemical operation was observed in the region between 4.5 V and 5.0 V both in the charge cycle and in the discharge cycle.

The invention claimed is:

1. A compound of formula (I):

$$A_aM_bP_cO_d \quad (I)$$

wherein M is at least one transition metal selected from the group consisting of Co, Ni, Mn, Fe, and Cr, optionally replaced by up to 20 mol % by Zn A is Li or $Li_xNa_{1-x}$, optionally replaced by up to 10 mol % by K, Be, Mg, or Ca, P is optionally replaced by up to 10 mol % by B, Si, or As, x is from 0.2 to 1.0, a is from 3.5 to 4.5, b is from 0.8 to 1.2, c is from 1.8 to 2.2 and d is from 7.2 to 8.8 wherein d is four times as large as c.

2. The compound according to claim 1, wherein A is replaced by up to 10 mol % by K, Be, Mg, or Ca.

3. The compound of claim 1, wherein a=4, b=1, c=2, and d=8.

4. The compound of claim 1, wherein M is replaced by up to 20 mol % by Zn.

5. The compound of claim 1, wherein M is $Co_yZn_{1-y}$, and y is from 0.75 to 1.0.

6. The compound of claim 1, wherein P is replaced by up to 10 mol % by B, Si, or As.

7. An electrode, comprising:
the compound of claim 1,
an electrically conductive, carbonaceous material, and
a binder.

8. The electrode according to claim 7, wherein the electrically conductive, carbonaceous material is at least one selected from the group consisting of graphite, carbon black, carbon nanotubes, and grapheme.

9. A process for producing an electrochemical cell, the process comprising:
producing an electrochemical cell with the compound of claim 1.

10. A process for producing an electrode, the process comprising:
producing an electrode with the compound of claim 1.

11. An electrochemical cell comprising the compound of claim 1.

12. A power source, comprising:
the electrochemical cell of claim 11,
wherein the power source is suitable for a mobile unit.

13. The power source according to claim 12, wherein the mobile unit is an automobile, a bicycle, an aircraft, a computer, a telephone, or a power tool.

14. A process for producing an electrode, the process comprising:
mixing an electrically conductive carbonaceous material, a binder, and a compound of formula (I):

$$A_a M_b P_c O_d \qquad (I)$$

wherein M is at least one transition metal selected from the group consisting of Co, Ni, Mn, Fe, and Cr,
A is Li or $Li_x Na_{1-x}$, x is from 0.2 to 1.0,
a is from 3.5 to 4.5,
b is from 0.8 to 1.2,
c is from 1.8 to 2.2 and
d is from 7.2 to 8.8 wherein d is four times as large as c.

15. A composite, comprising an electrically conductive carbonaceous material and a compound of formula (I):

$$A_a M_b P_c O_d \qquad (I)$$

wherein M is at least one transition metal selected from the group consisting of Co, Ni, Mn, F, and Cr,
A is Li or $Li_x Na_{1-x}$, x is from 0.2 to 1.0,
a is from 3.5 to 4.5,
b is from 0.8 to 1.2,
c is from 1.8 to 2.2, and
d is from 7.2 to 8.8 wherein d is four times as large as c.

16. The process of claim 14, further comprising:
applying the carbonaceous material, the binder, and the compound of formula (I) after mixing to a metal foil, a polymer film, or any combination thereof.

17. A method of manufacturing a power source, the method comprising:
manufacturing a power source with the electrochemical cell of claim 11,
wherein the power source is suitable for a mobile unit.

18. A mobile unit, comprising:
the power source of claim 12.

* * * * *